US011176379B2

United States Patent
Chen et al.

(10) Patent No.: US 11,176,379 B2
(45) Date of Patent: Nov. 16, 2021

(54) METHOD OF ACQUIRING DETECTION ZONE IN IMAGE AND METHOD OF DETERMINING ZONE USAGE

(71) Applicants: INVENTEC (PUDONG) TECHNOLOGY CORPORATION, Shanghai (CN); INVENTEC CORPORATION, Taipei (TW)

(72) Inventors: You-Gang Chen, Taipei (TW); Jiun-Kuei Jung, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 19 days.

(21) Appl. No.: 16/721,370

(22) Filed: Dec. 19, 2019

(65) Prior Publication Data

US 2021/0150218 A1      May 20, 2021

(30) Foreign Application Priority Data

Nov. 19, 2019   (CN) .......................... 201911136669.2

(51) Int. Cl.
*G06K 9/00* (2006.01)
*G06K 9/32* (2006.01)

(52) U.S. Cl.
CPC ..... *G06K 9/00718* (2013.01); *G06K 9/00825* (2013.01); *G06K 9/3233* (2013.01); *G06K 2009/00738* (2013.01); *G06K 2209/23* (2013.01)

(58) Field of Classification Search
CPC .......... G06K 9/00718; G06K 9/00825; G06K 9/3233; G06K 2009/00738; G06K 2209/23
See application file for complete search history.

(56) References Cited

U.S. PATENT DOCUMENTS

2016/0362050 A1* 12/2016 Lee ........................... B60R 1/00
2019/0294889 A1*  9/2019 Sriram ................. G06K 9/6274

OTHER PUBLICATIONS

Serhan Cosar "Towards Abnormal Trajectory and Event detection and Video Surveillance" (Year: 2017).*

\* cited by examiner

*Primary Examiner* — Dhaval V Patel
(74) *Attorney, Agent, or Firm* — Maschoff Brennan

(57) ABSTRACT

A method of acquiring detection zone in image, comprises: sequentially acquiring a plurality of images associated with an image acquiring scene by a camera, computing a plurality of moving traces of a plurality of objects in the plurality of images by a computing device, performing a clustering procedure to the moving traces by the computing device to obtain a detection zone, and displaying the detection zone and another image by a display device, with said another image different from the plurality of images and associated with the image acquiring scene.

8 Claims, 6 Drawing Sheets

METHOD OF ACQUIRING DETECTION ZONE IN IMAGE AND METHOD OF DETERMINING ZONE USAGE

CROSS-REFERENCE TO RELATED APPLICATIONS

This non-provisional application claims priority under 35 U.S.C. § 119(a) on Patent Application No(s). 201911136669.2 filed in China on Nov. 19, 2019, the entire contents of which are hereby incorporated by reference.

BACKGROUND

1. Technical Field

This disclosure relates to a method of acquiring detection zone in image and method of determining zone usage, particularly to a method of acquiring detection zone and method of determining zone usage based on multiple moving traces of multiple objects in an image.

2. Related Art

In order to monitor the moving direction, travel time, and dwell time of vehicles on the road, various monitoring methods have been developed to monitor the behavior of vehicles. However, most monitoring methods still use surveillance cameras to capture multiple scenes for monitoring personnel to determine whether there are any abnormal activities in the scenes based on the images captured by the surveillance cameras. Besides, whenever a surveillance camera is set up in a new monitoring site, it is still necessary to manually determine the directions of every lane and circle the region of interest (ROI) in every lane.

However, the manually circled ROI may not be the most effective detection zone, which may cause inaccuracy in the calculated or statistic data of the traffic flow in the detection zone. Besides, if multiple cameras need to be set up in a new monitoring site, every detection zone of the scene captured by each camera still needs to be circled manually, which further results in a waste of time. Also, the camera installed in the monitoring site may be shifted due to external forces (such as vibration or wind), causing the originally set detection zone to shift, and in turn, the monitoring personnel has to go to the monitoring site to manually adjust the shifted camera.

SUMMARY

According to one or more embodiments of this disclosure, a method of acquiring detection zone in image, comprising: sequentially acquiring a plurality of images associated with an image acquiring scene by a camera; computing a plurality of moving traces of a plurality of objects in the plurality of images by a computing device; performing a clustering procedure to the moving traces to obtain a detection zone by the computing device; and displaying the detection zone and another image by a display device, with said another image different from the plurality of images and associated with the image acquiring scene.

According to one or more embodiments of this disclosure, a method of determining zone usage, comprising: by a camera, sequentially acquiring a plurality of images associated with an image acquiring scene; by a computing device, computing a plurality of moving traces of a plurality of objects in the images; by the computing device, performing a clustering procedure to the moving traces to obtain a detection zone; by the computing device, performing an event detection procedure based on the detection zone, wherein the event detection procedure is determining whether a behavior of a detected object meets an event rule by the computing device; and by the computing device, outputting a detection result of the event detection procedure.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

The method of acquiring detection zone in image of the present disclosure is used to acquire a detection zone of an image acquiring scene captured by a camera. For example, the detection zone can be a detection zone of the image acquiring scene of a street, highway, department store, shopping mall, farms, etc., wherein the image acquiring scene is preferably a monitoring site having multiple moving objects, the present disclosure is not limited thereto. For easier understanding of the present disclosure, the method of acquiring detection zone in image disclosed in the following embodiments uses a street view as an example of the image acquiring scene.

Figure 1:
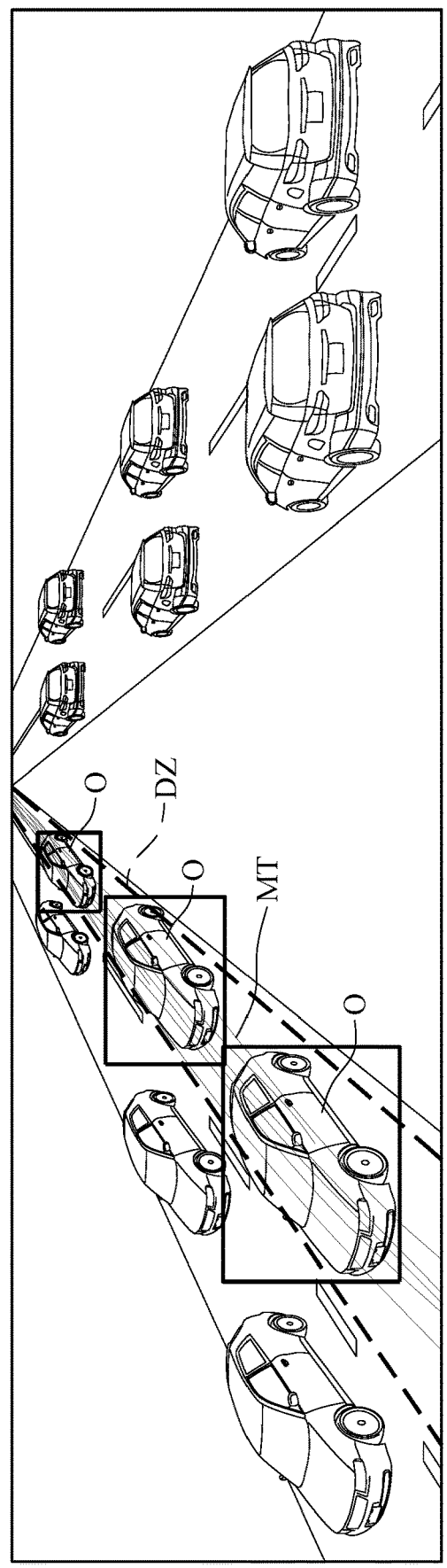
FIG. 1 is a schematic diagram of a method of acquiring detection zone in image according to an embodiment of the present disclosure.
Figure 2:
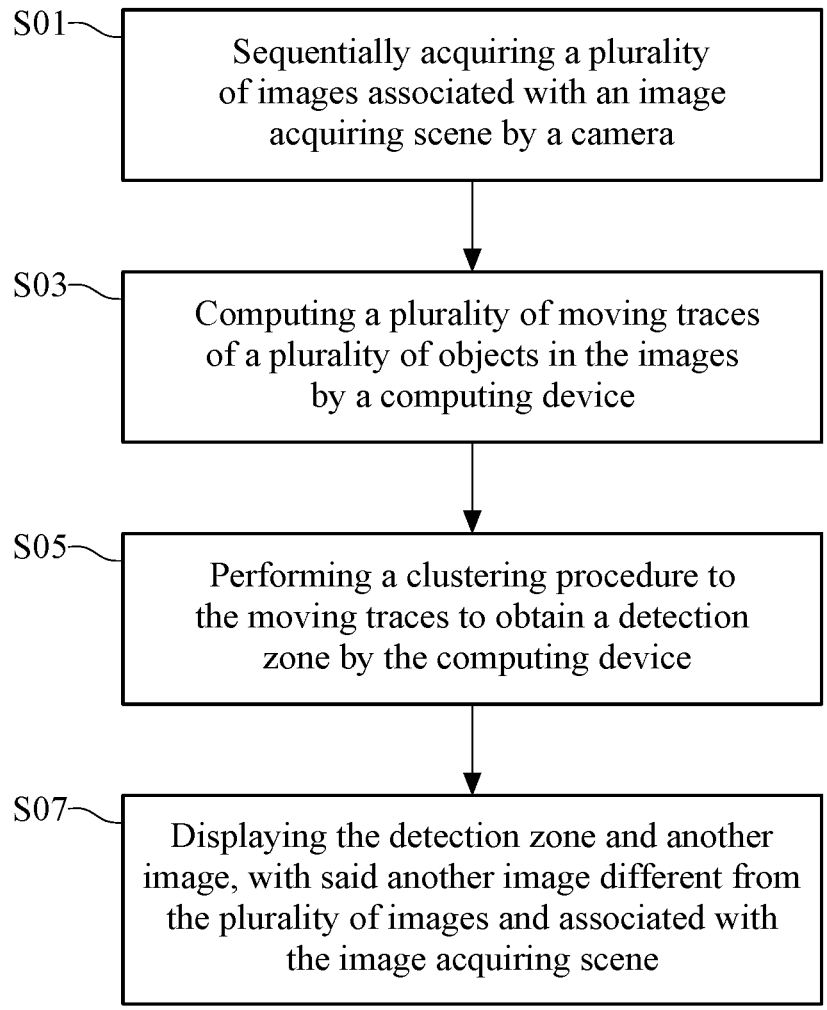
FIG. 2 is a flow chart of a method of acquiring detection zone in image according to an embodiment of the present disclosure.

Please refer to FIGS. 1 and 2 together, wherein FIG. 1 is a schematic diagram of a method of acquiring detection zone in image according to an embodiment of the present disclosure; FIG. 2 is a flow chart of a method of acquiring detection zone in image according to an embodiment of the present disclosure.

Please refer to step S01: sequentially acquiring a plurality of images associated with an image acquiring scene by a camera. The camera is, for example, a surveillance camera installed at the side of the road, the image acquiring scene is the street view captured by the camera, and the image is the image of the street view as shown in FIG. 1. To be more specific, the images captured by the camera are images that camera sequentially captured at different time, and the images include a plurality of objects O as shown in FIG. 1.

After acquiring the images by the camera, the computing device then computes a plurality of moving traces MT of the objects O in the images in step S03. In detail, the camera acquires a first image at a first acquisition time, the computing device then uses a neural network deep learning method to identify the objects in the first image, and a plurality of first coordinates of the objects in the first image, wherein a confidence value of the identification result is higher than a threshold value. The camera then acquires a second image at a second acquisition time, the computing device then uses the neural network deep learning method to identify the objects in the second image, and a plurality of second coordinates of the objects in the second image, wherein a confidence value of the identification result is higher than a threshold value. The computing device then obtains the moving traces MT of every object in the images based on the first coordinate and the second coordinate of every object. In other words, the computing device computes the moving trace MT of each object based on the neural network deep learning method for the confidence value and coordinates of each object. The computing device is, for example, a central processing device or a cloud server with computing function of a monitoring center; and the neural network deep learning method is, for example, convolutional neural network (CNN) of the artificial intelligence (AI) technology. The present disclosure is not limited thereto.

Please continue referring to step S03. In detail, when the computing device identifies the object in the image using the neural network deep learning method, the confidence value can be added at the same time, wherein the confidence value represents the degree of certainty that the computing device has towards the identification result after the object is identified using the neural network deep learning method. When the confidence value reaches the threshold value (for example, 70%), that means the identification result of the computing device using the neural network deep learning method is reliable. For example, the computing device identifies the object O in the image shown in FIG. 1 is a vehicle using the neural network deep learning method, and generates the corresponding confidence value. When the confidence value reaches 70%, meaning the identification result that the object O is a vehicle obtained by using the neural network deep learning method is reliable.

Please continue referring to step S03, wherein, after the computing device identify the objects O, the computing device then obtains the coordinates of the objects O in the images in time sequence. Take one object O as an example, the computing device obtains the coordinate of the object O in each of the multiple images and connects the coordinate in time sequence to obtain the moving trace MT of the object O.

After obtaining the moving trace MT, the computing device then performs a clustering procedure to the moving traces MT to obtain a detection zone DZ in step S05, wherein the clustering procedure includes obtaining multiple boundary points based on the moving traces MT, and obtaining the detection zone DZ according to the boundary points. The computing device obtains the detection zone DZ according to the moving traces MT can be based on a probability distribution function. For better explanation of the following description, the following uses the normal distribution function as the probability distribution function as an example. The normal distribution function is preferably a binary normal distribution function, and one dimension of the normal distribution function is the density of the moving traces MT, the other dimension of the normal distribution function is the distribution of intersections between the moving traces MT and a reference line.

Figure 3A:
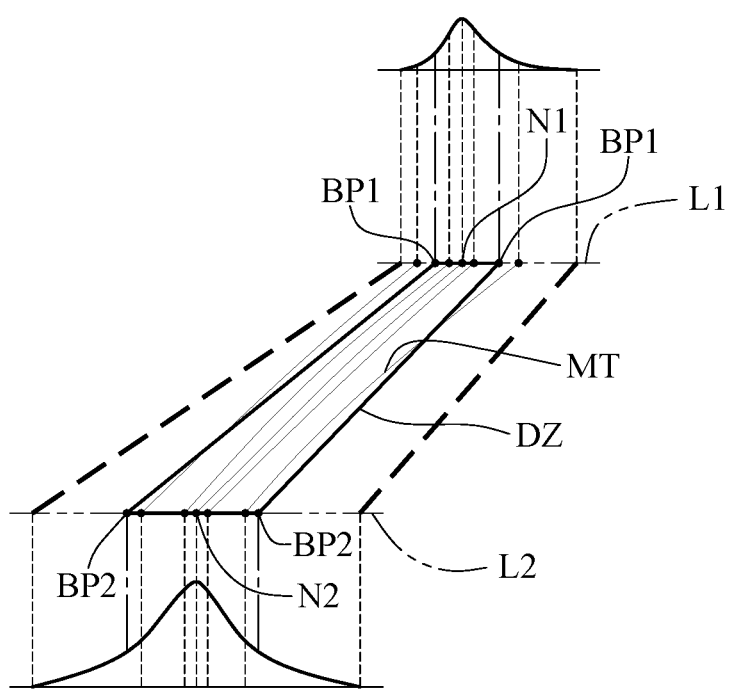
FIGS. 3(a) and 3(b) are schematic diagrams of a method of acquiring detection zone in image according to an embodiment of the present disclosure.

Please refer to FIG. 3(a). FIG. 3(a) is a schematic diagram of a method of acquiring detection zone in image according to an embodiment of the present disclosure. In detail, an implementation of performing the clustering procedure to the moving traces MT to obtain the boundary points can be the computing device deriving the normal distribution function based on the moving traces MT, and defining the boundary lines of the detection zone DZ with two boundary values of the confidence interval of the normal distribution function, wherein the confidence interval is, for example, 68% to 95% of the normal distribution function. The present disclosure is not limited thereto. Especially, according to the implementation of the normal distribution function, the computing device obtains a normal distribution of multiple first intersections N1 and two first boundary points BP1 of its confidence interval, and obtains a normal distribution of multiple second intersections N2 and two second boundary points BP2 of its confidence interval. The computing device then uses an area enclosed by the two first boundary points BP1 and the two second boundary points BP2 as the detection zone DZ. The multiple first intersections N1 are the intersections of the moving traces MT and the reference line L1; the multiple intersections N2 are the intersections of the moving traces MT and the reference line L2. Each of these moving traces MT extends from its starting point to its ending point, and the first intersections N1 preferably includes the starting point of one of the moving traces MT, and the second intersections N2 preferably includes the ending point of one of the moving traces MT.

Figure 3B:
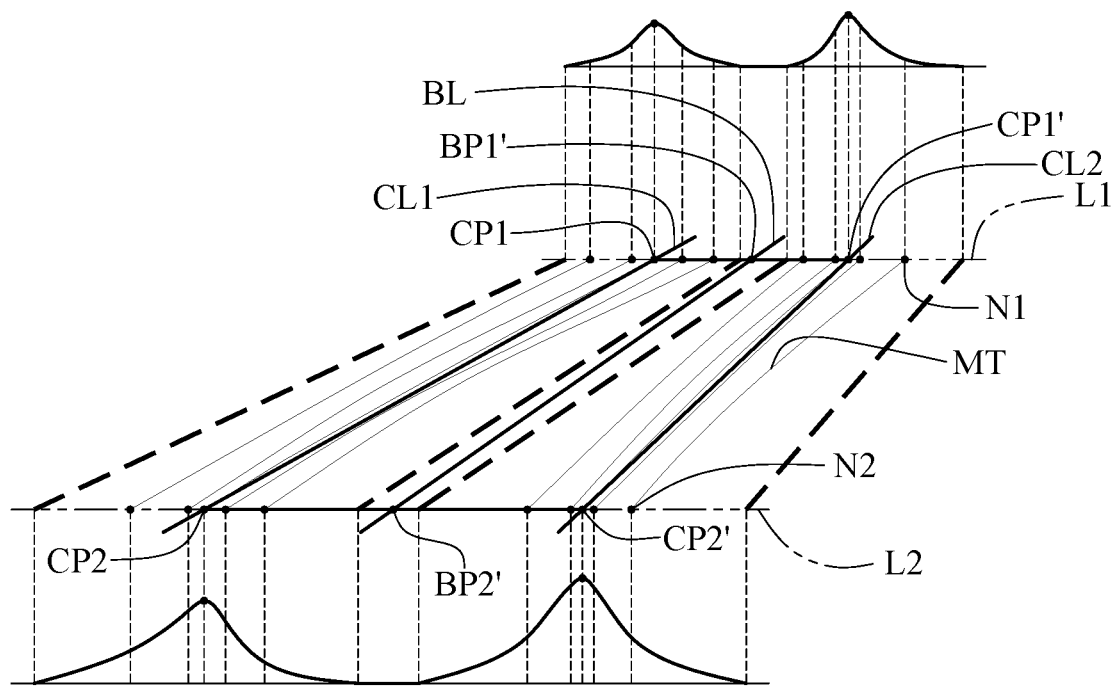

Please refer to FIG. 3(b). FIG. 3(b) is a schematic diagram of a method of acquiring detection zone in image according to an embodiment of the present disclosure, particularly another method of obtaining the boundary lines BL of the detection zone DZ. The method of obtaining the boundary lines BL is performed based on at least two groups of moving traces MT, meaning the normal distribution function constituted by the moving traces MT and one reference line has at least two confidence intervals. For better understanding, the following uses moving traces MT that can form two confidence intervals for description. After obtaining the two confidence intervals correspond to the reference line L1 and the two confidence intervals correspond to the reference line L2, the computing device obtains a center line CL1 based on two center points of the two confidence intervals of the reference line L1 and the reference line L2 based on the moving traces MT of the same group among the moving traces MT, and obtains a center line CL2 based on two center points of the two confidence intervals of the reference line L1 and the reference line L2 based on the moving traces MT of the other group among the moving traces MT. The computing device then obtains the boundary line BL of the detection zone based on the two center lines CL1 and CL2. An implementation of deriving the normal distribution function based on the moving traces MT by the computing device can be the same as by the reference lines L1 and L2 described above, so the operation details of deriving the normal distribution function are not described herein.

In detail, please first refer to the group of moving traces MT on the left in FIG. 3(b). After deriving the two normal distribution functions based on the moving traces MT, the computing device uses a line connecting a first center point CP1 and a second center point CP2 of the confidence intervals of the two normal distribution functions as the first center line CL1, wherein the first center point CP1 and the second center point CP2 are, for example, respectively 50% of the two normal distribution functions, the present disclosure is not limited thereto. Please refer to the group of moving traces MT on the right in FIG. 3(b). Similarly, the computing device uses a line connecting a first center point CP1' and a second center point CP2' of the confidence intervals of the other two normal distribution functions as the second center line CL2. Subsequently, the computing device equally divides the distance between the first center line CL1 and the second center line CL2 to obtain the boundary line BL.

Please continue referring to the embodiment of FIG. 3(b). After obtaining the boundary line BL, the computing device can obtain another boundary line which is symmetrical to the boundary line BL and on the other side of the first center line CL1 by using the first center line CL as a center line. The computing device can use the area enclosed by the two boundary lines BL and the two reference lines L1 and L2 as the detection zone DZ. Similarly, the computing device can also use the second center line CL2 as the center line to obtain the detection zone DZ. It is worth noting that, when respectively using the first center line CL1 and the second center line CL2 as the center lines to obtain three boundary lines BL, the computing device can move the two boundary lines BL located on the both sides of the first center line CL1 towards the first center line CL1 by a preset distance as the updated two boundary lines BL, and move the two boundary lines BL located on the both sides of the second center line CL2 towards the second center line CL2 by the preset distance as the updated two boundary lines BL. The preset distance can be 20% of the distance between the two first center points CP1 and CP1', or 20% of the distance between the two second center points CP2 and CP2', the present disclosure is not limited thereto. Accordingly, the two detection zones DZ connecting to each other can be separated apart.

In addition, when there are at least four groups of the moving traces MT, the computing device can perform the method of obtaining the boundary line BL disclosed in FIG. 3(b), which is obtaining two boundary lines BL based on the four groups of the moving traces MT, and then using the area enclosed by the two boundary lines BL and two reference lines L1 and L2 as the detection zone DZ.

According to the methods of obtaining the boundary line disclosed in FIGS. 3(a) and 3(b), the computing device can then obtain the detection zone DZ based on the boundary lines BL. As for the example shown in FIG. 1, the detection zone DZ is in the car lane in which vehicles are traveling, and the boundary lines BL are the lines that overlapping or adjacent to the car lane line.

After obtaining the detection zone DZ, the method of obtaining the detection zone DZ continues to step S07 to display the detection zone DZ and another image by a display device, with said another image different from the plurality of images and associated with the image acquiring scene, wherein said another image is preferably a real-time image with the detection zone DZ applied. The display device is, for example, a display screen provided in a monitoring center, the present disclosure is not limited thereto.

In detail, after obtaining the detection zone DZ, the camera continuously acquires the real-time images of the image acquiring scene for the display device to display. Meaning, the time of acquiring the images is prior to the time of acquiring the real-time image, and the real-time image displayed by the display device is marked with the detection zone DZ, wherein the number of the detection zone DZ marked on the real-time image can be one or more, the present disclosure is not limited thereto.

After displaying the detection zone DZ and the real-time image by the display device (step S07), the implementation of the present disclosure further includes acquiring multiple images sequentially (step S01) by the camera again after an interval, so as to obtain the detection zone DZ that corresponds to different traffic condition in different period.

Figure 4:
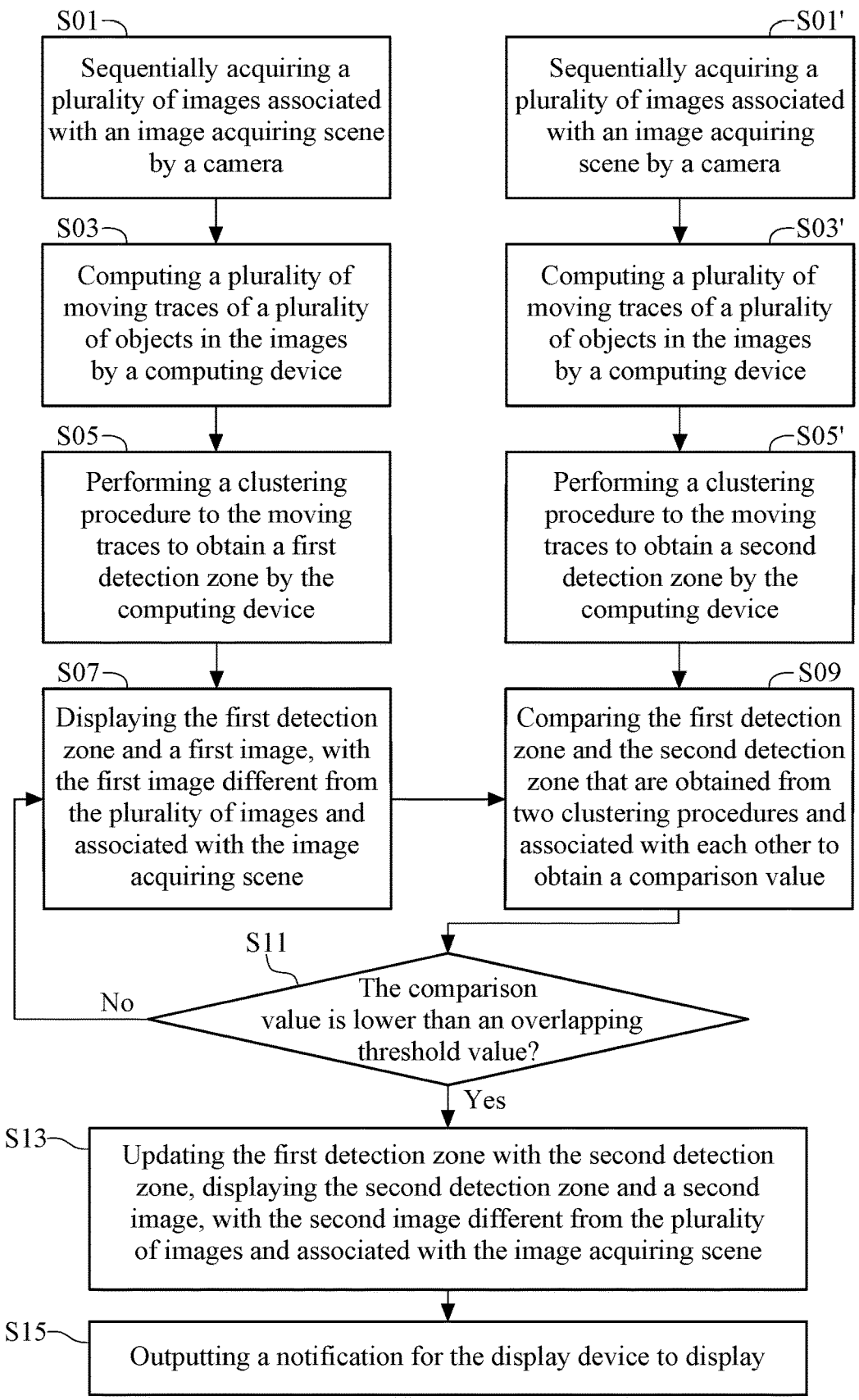
FIG. 4 is a flow chart of a method of acquiring detection zone in image according to another embodiment of the present disclosure.

Please refer to FIG. 4. FIG. 4 is a flow chart of a method of acquiring detection zone in image according to another embodiment of the present disclosure. Steps S01 to S05 and steps S01' to S05' disclosed in FIG. 4 are the same as steps S01 to S05 disclosed in FIG. 2, which will not be further described herein. However, the method of acquiring detection zone in image disclosed in FIG. 4, the images acquired in step S01 are different from the images acquired in step S01'; the moving traces obtained in step S03 are different from the moving traces obtained in step S03'. Therefore, a first detection zone obtained by performing the clustering procedure (step S05) on the moving traces obtained in step S03 is different from a second detection zone obtained by performing the clustering procedure (step S05') on the moving traces obtained in step S03'. In addition, in the present embodiment, steps S01 to S05 preferably are performed prior to steps S01' to S05'.

In detail, after obtaining the first detection zone in step S05 and displaying a first image having the first detection zone in step S07, the computing device then performs steps S01' to S05' to obtain the second detection zone, wherein the number of the first detection zone and the second detection zone can be one or more, the present disclosure is not limited thereto. In other words, the first image and the second image described in steps S01 and S01' preferably are real-time images that are acquired at the same image acquiring scene but at different timing.

After obtaining the first detection zone and then the second detection zone, the computing device further compares the first detection zone and the second detection zone to obtain a comparison value in step S09. The comparison value is used to represent the amount of overlapping between the first detection zone and the second detection zone. To be more specific, the first detection zone and the second detection zone that are associated with each other preferably are detection zones that are acquired at the same period of time but different date. The computing device can determine whether the camera has been shifted by comparing the first detection zone and the second detection zone that are acquired at the same time period but different date. The implementation of obtaining the amount of overlapping between the first detection zone and the second detection zone can be to determine a percentage of the second detection zone overlapping the first detection zone, and use the percentage as the comparison value.

Please refer to step S11, wherein the computing device then determines whether the comparison value is lower than an overlapping threshold value. In other words, the computing device determines whether the camera has been shifted based on the comparison value and the overlapping threshold value, wherein the overlapping threshold value is, for example, 80%, the present disclosure is not limited thereto.

When the computing device determines the comparison value is lower than the overlapping threshold value in step S11, that means the camera may have been shifted due to external forces such as the wind or vibration. The computing device then updates the first detection zone with the second detection zone in step S13, and outputs a notification for the display device to display in step S15. On the contrary, when the comparison value is not lower than the overlapping threshold value, that means the camera may not have been shifted, or the amount of the camera being shifted is within an allowable range, the computing device then continues to compare the first detection zone and the second detection zone in step S09.

It is worth noting that, step S13 illustrated in FIG. 4 is performed before step S15, however, step S13 and S15 can be performed simultaneously, or, step S13 can be performed after step S15. The present disclosure is not limited thereto.

In other words, the computing device updating the first detection zone with the second detection zone in step S13 is using the newly acquired second detection zone as the detection zone. The computing device then outputs the notification in step S15 to notify the monitoring center that there might be some abnormal activities with the camera. Accordingly, when the camera is shifted, the detection zone of the image acquiring scene is not affected even when the monitoring personnel doesn't adjust the camera immediately.

Figure 5:
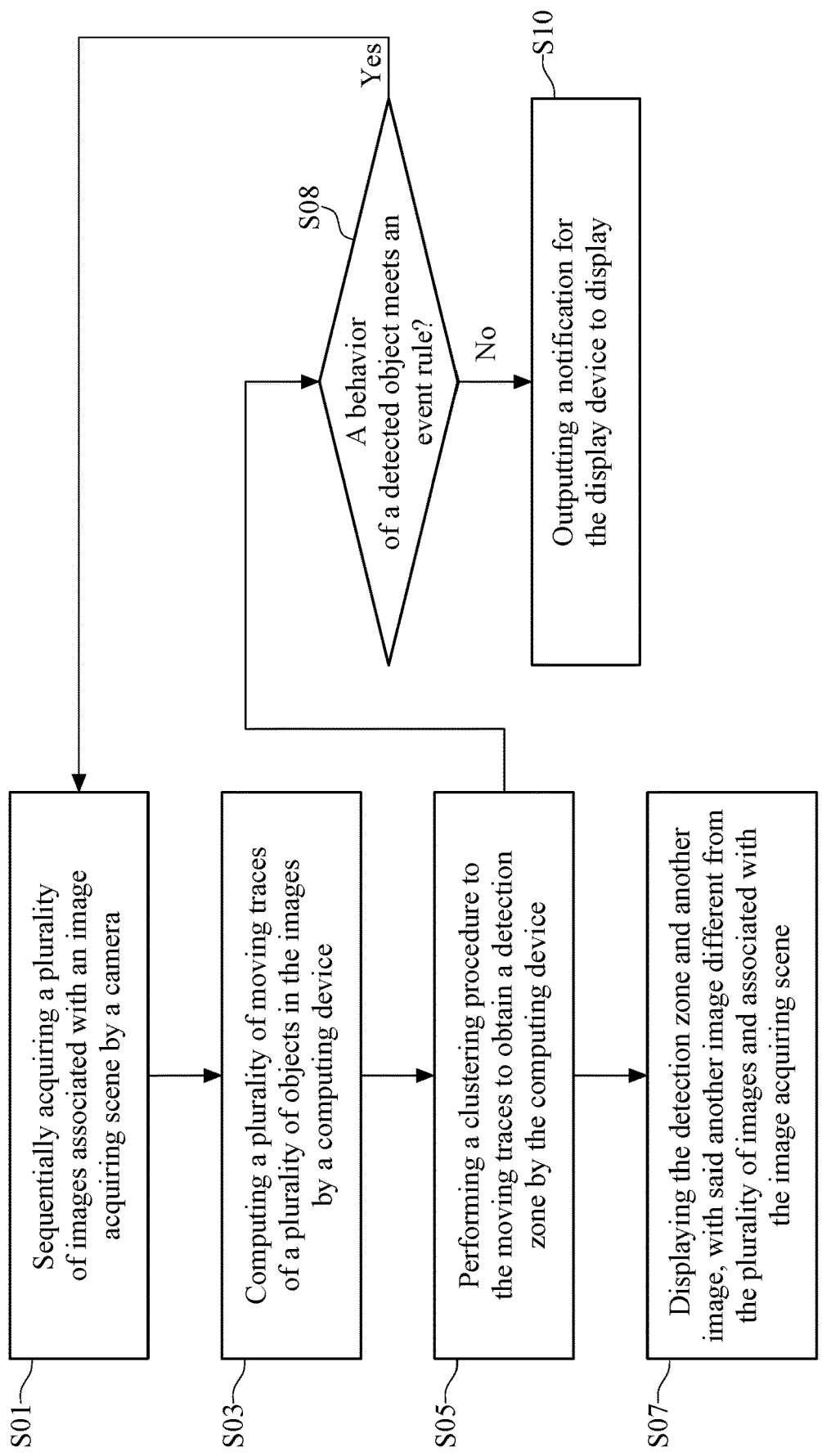
FIG. 5 is a flow chart of a method of determining zone usage in image according to an embodiment of the present disclosure.

Please refer to FIG. 5. FIG. 5 is a flow chart of a method of determining zone usage in image according to an embodiment of the present disclosure. The method of determining zone usage in image disclosed in FIG. 5 is preferably used to determine whether the behavior of an object meets an event rule. Steps S01 to S07 disclosed in FIG. 5 are the same as steps S01 to S07 disclosed in FIG. 2, which will not be further described herein. Please refer to FIG. 5, wherein, after obtaining the detection zone (step S05) by performing the clustering procedure, not only step S07 can be performed to display the detection zone and another image by the display device, with said another image different from the plurality of images and associated with the image acquiring scene, step S08 can be performed to perform an event detection procedure to determine whether a behavior of a detected object meets an event rule. However, steps S07 and S08 described above can also be performed together. The event rule is one of the following, for example, a flow of objects in the detection zone, whether one of the objects exists in the detection zone (detection of an area that is forbidden for any entry), whether the time of one of the objects stays in the detection zone reaches a default time (parking detection), whether one of the objects in the detection zone moves in a default direction (detection of vehicle moving in the wrong direction), and whether a speed of one of the objects in the detection zone falls in a default speed interval (detection of driving over speed limit or below a minimum speed), the present disclosure is not limited thereto.

In detail, when the event rule is that none of the object can exist in the detection zone, the event detection procedure includes determining whether a coordinate of a detected object falls in the detection zone. Similarly, when the event rule is related to the dwell time or movement of one of the objects in the detection zone, and the coordinates of the object fall in the detection zone, the event detection procedure is performed based on the coordinates and a plurality of time points corresponding to the coordinates respectively, so as to determine the dwell time or movement of the detected object based on the coordinates and the plurality of time points.

After performing the event detection procedure in step S08, the computing device then outputs a detection result of the event detection procedure in step S10. Specifically, when the event detection procedure is performed to obtain the flow of the object in the detection zone (for example, traffic flow), the detection result preferably includes the object flow in the detection zone, or the abnormal activity of the object flow. In addition, the computing device can output the detection result to a storage device (for example, a memory) of the monitoring center for record, or to the display device for display, the present disclosure is not limited thereto.

When the behavior of the detected object does not meet the event rule, the computing device can output the detection result including a notification for the display device to display. On the contrary, when the computing device determines the behavior of the detected object meets the behavior rule in step S08, the camera sequentially acquires multiple images that are associated with the image acquiring scene in step S01 to update the detection zone.

Take the vehicle mentioned above as an example, the detected object is a vehicle that exists in the image acquiring scene after obtaining the detection zone. Therefore, when the coordinate of the vehicle (detected object) falls in the detection zone, the time of the vehicle stays in the detection zone exceeds the default time of the event rule, the moving direction of the vehicle in the detection zone does not meet the default direction of the event rule, or the speed of the vehicle moving in the detection zone falls outside of the default speed interval, the computing device then outputs the notification for the display device to display to notify the monitoring center that there may be abnormal activity in the image acquiring scene.

Please continue referring to step S08. However, when the computing device performs the event detection procedure in step S08 and determines the behavior of the detected object does not meet the event rule, step S01 can also be performed to obtain multiple images by the camera that are associated with the image acquiring scene; and when the behavior of the detected object meets the event rule, output the notification by the computing device for the display device to display.

In view of the above description, according to one or more embodiments of the method of acquiring detection zone in image of the present disclosure, an effective detection zone can be obtained based on the moving traces of the object. In addition, the detection zone doesn't need to be manually circled when cameras are set up in a new monitoring site, in turn saves the time of manually obtaining the detection zone.

According to one or more embodiments of the method of determining zone usage according to the present disclosure, after obtaining the detection zone, the computing device can determine the object flow and whether there are any abnormal activities of the objects in the monitoring site. Furthermore, the computing device can also determine whether the camera is shifted, and notify the monitoring center accordingly. When the camera is shifted, the accuracy of the detection zone is not greatly affected even when the monitoring personnel doesn't adjust the shifted camera immediately.

The present disclosure has been disclosed above in the embodiments described above, however it is not intended to limit the present disclosure. It is within the scope of the present disclosure to be modified without deviating from the essence and scope of it. It is intended that the scope of the present disclosure is defined by the following claims and their equivalents.

What is claimed is:

1. A method of acquiring detection zone in image, comprising:
   sequentially acquiring a plurality of images associated with an image acquiring scene by a camera;
   computing a plurality of moving traces of a plurality of objects in the plurality of images by a computing device;
   performing a clustering procedure to the moving traces to obtain a detection zone by the computing device; and by a display device, displaying the detection zone and another image, with said another image different from the plurality of images and associated with the image acquiring scene, wherein the clustering procedure comprises: by the computing device, obtaining two boundary points of a confidence interval of a probability distribution function based on an intersection of the moving traces and a reference line, obtaining two boundary points of a confidence interval of another probability distribution function based on an intersection of the moving traces and another reference line, and using an area surrounded by the four boundary points as the detection zone.

2. The method of acquiring detection zone in image according to claim 1, wherein the detection zone is a first detection zone, and the method comprises:

by the computing device, comparing the first detection zone and a second detection zone obtained by performing another clustering procedure to obtain a comparison value, wherein the plurality of images are acquired prior to images used for obtaining the second detection zone;

updating the first detection zone with the second detection zone when the computing device determines that the comparison value is lower than an overlapping threshold value; and outputting a notification for the display device to display.

3. The method of acquiring detection zone in image according to claim 1, wherein computing the plurality of moving traces of the plurality of objects in the plurality of images by the computing device comprises: by the computing device, computing the moving traces according to a plurality of first locations of the objects at a first image acquiring time, and a plurality of second locations of the objects at a second image acquiring time.

4. The method of acquiring detection zone in image according to claim 1, wherein computing the plurality of moving traces comprises:

identifying the objects in the plurality of images using a neural network deep learning method and obtaining a plurality of confidence values associated with the objects;

by the computing device, determining whether the confidence values reach a threshold value; and by the computing device, computing the moving traces of the objects in the plurality of images when the confidence values reach the threshold value.

5. A method of determining zone usage, comprising:

sequentially acquiring a plurality of images associated with an image acquiring scene by a camera;

computing a plurality of moving traces of a plurality of objects in the plurality of images by a computing device;

performing a clustering procedure to the moving traces to obtain a detection zone by the computing device;

performing an event detection procedure based on the detection zone by the computing device, wherein the event detection procedure determining whether a behavior of a detected object meets an event rule by the computing device; and outputting a detection result of the event detection procedure by the computing device, wherein the clustering procedure comprises: by the computing device, obtaining two boundary points of a confidence interval of a probability distribution function based on an intersection of the moving traces and a reference line, obtaining two boundary points of a confidence interval of another probability distribution function based on an intersection of the moving traces and another reference line, and using an area surrounded by the four boundary points as the detection zone.

6. The method of determining zone usage according to claim 5, wherein the event rule is whether a time of one of the objects stays in the detection zone reaches a default time, and determining whether the behavior of the detected object meets the event rule based on the detection zone by the computing device comprises:

determining whether a coordinate of the detected object falls in the detection zone by the computing device; and determining, by the computing device, whether the time of the coordinate of the detected object falling in the detection zone reaches the default time when the coordinate of the detected object falls in the detection zone.

7. The method of determining zone usage according to claim 5, wherein the event rule is whether one of the objects in the detection zone moves in a default direction, and determining whether the behavior of the detected object meets the event rule based on the detection zone by the computing device comprises:

determining whether a coordinate of the detected object falls in the detection zone by the computing device; and determining, by the computing device, whether the detected object moves in the default direction based on a plurality of coordinates of the detected object and a plurality of time points corresponding to the plurality of coordinates respectively when the coordinate of the detected object falls in the detection zone.

8. The method of determining zone usage according to claim 5, wherein the event rule is whether a speed of one of the objects in the detection zone falls in a default speed interval, determining whether the behavior of the detected object meets the event rule based on the detection zone by the computing device comprises:

determining whether a coordinate of the detected object falls in the detection zone by the computing device; and determining, by the computing device, whether the speed of the detected object falls in the default speed interval based on a plurality of coordinates of the detected object and a plurality of time points corresponding to the plurality of coordinates respectively when the coordinate of the detected object falls in the detection zone.

* * * * *